Patented Apr. 6, 1954

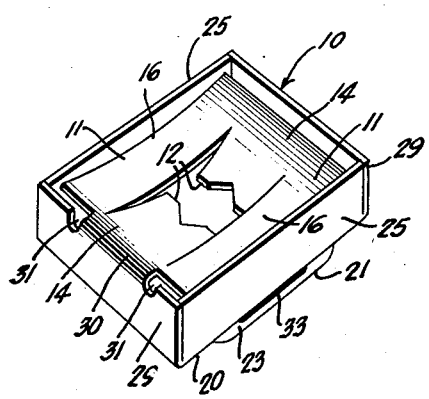
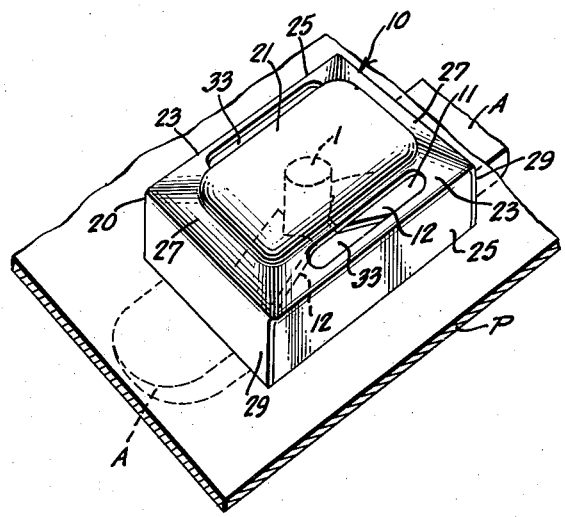
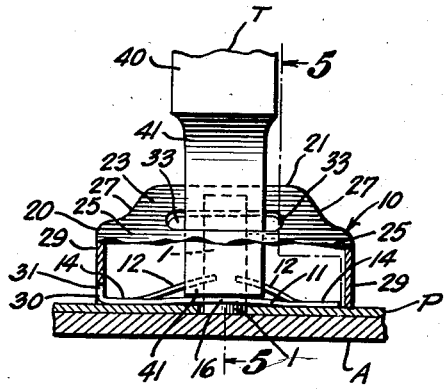
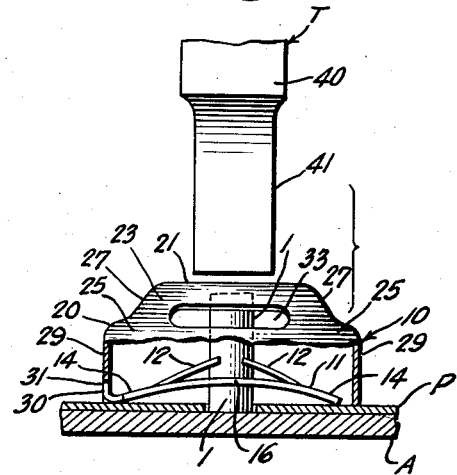
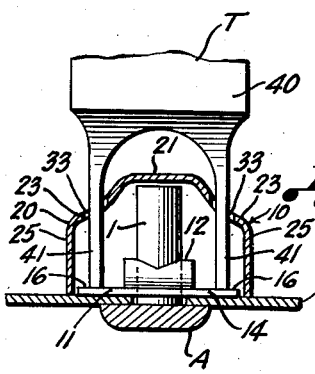

2,674,150

UNITED STATES PATENT OFFICE 2,674,150

FASTENING DEVICE

Laurence H. Flora, Cleveland, Ohio, assignor to Tinnerman Products, Inc., Cleveland, Ohio, a corporation of Ohio Application January 29, 1953, Serial No. 333,995

2 Claims. (Cl. 85—36)

This invention relates in general to fasteners for providing a protective and ornamental covering over the exposed ends of threadless connecting studs and similar shank elements in an assembly of secured parts and deals, more particularly, with such securing devices in the form of cap fasteners, and the like, which are adapted to be easily and quickly applied by a simple pushing action to tightened tensioned fastening position without need for any special locking or retaining means on the threadless connecting studs or similar shank elements.

In many instances, it is most advantageous to secure the parts of an assembly by a threadless stud such as the shank of a rivet or an integral connecting stud on one part having its projecting end extending through an opening in an associated part and secured by a fastener in the form of a spring nut or locking plate, or the like. In certain installations, the fastening means in such an assembly are open to objection in that they lack a pleasing finished appearance and the projecting ends of the studs are exposed and the spring nuts or similar fasteners have sharp points or edges that might cause injury and damage such as cuts and scratches on the hands and rips and tears on the clothing of one handling or using the assembly.

A primary object of the invention, therefore, is to provide an improved fastener of this character in the form of a cap nut or similar device comprising a base portion defining a spring nut or locking plate, or the like, having integral clutch elements or tongues adapted to be secured by an axial thrust-like fastening action in engagement with the end of a connecting stud together with a cap portion covering said base portion of the fastener and the end of the stud in a manner to provide for protection against the sharp points and edges of the tongues on the spring nut and the end of the stud, while otherwise providing the pleasing and attractive appearance of a finishing button, or the like, over the end of the stud.

A further object of the invention is to provide an improved fastener such as described in the form of a cap nut, or the like, in which the cap portion of the fastener is provided with recesses or holes for passing elements of a tool into engagement with the underlying fastener base as necessary to apply the spring nut or locking plate defined by said fastener base into tightened tensioned fastening position on the stud.

Further objects and advantages, and other new and useful features in the construction, arrangement and general combination of elements of the improved fastener of the invention will be readily apparent as the following description proceeds with reference to the accompanying drawings, for purposes of illustration but not of limitation, in which like reference characters designate like parts throughout, and in which:

Fig. 1 is a fragmentary perspective view of the rear of an assembly in which a cap fastener in accordance with the invention is shown as applied to fastening position on the end of a connecting or attaching stud on an object such as a nameplate, molding, or the like, to secure the same to a panel or other support, Fig. 2 is a perspective of the fastener per se as seen from the underside thereof and shows the spring nut or locking plate defined by the base of the fastener;

Fig. 3 is a vertical sectional view lengthwise of the assembly of Fig. 1 in which the fastener, illustrated partly in section, is shown in initially attached position on the end of the connecting stud and with a tool in position to be applied to secure the fastener in tightened tensioned fastening position on said stud;

Fig. 4 is a view similar to Fig. 3 showing the tool as actuated to apply the fastener to its final fastening position in tightened tensioned engagement on the stud; and, Fig. 5 is a sectional view of Fig. 4 as seen on line 5—5 looking in the direction of the arrows.

Fasteners in accordance with the present invention are of general utility and have a wide range and variety of applications and uses as the means for providing a protective and ornamental covering over the exposed ends of projecting studs, or the like, in practically any assembly of secured parts. In the door assembly of a glove compartment of an automobile, for example, a nameplate, emblem or other object is usually mounted on the door by threadless connecting studs on the object secured by sheet metal spring nuts applied to the projecting ends of the studs at the rear of the door, and when the door is opened for access to the glove compartment, there is always the danger that the exposed ends of the studs and the exposed sharp points and edges of the usual spring nuts will cause cuts and scratches to the hands and tears and snags to the clothing. The use of cap-type spring nuts in accordance with the invention removes the danger of any such injury or damage and otherwise provides a pleasing and attractive button-like appearance over the end of each of the connecting studs 1. Likewise, the cap fasteners of the invention are admirably suited for many uses in the manufacture of toys and the like where exposed studs, shaft ends, axles, etc., are a hazard, and also, in the manufacture of various cabinet structures, office equipment, radio and television apparatus and home appliances where it is frequently necessary or desirable to provide a protective and ornamental covering over the exposed ends of projecting studs and similar elements in the securing means provided.

The object secured may be made of metal, plastic, wood or other material and provided with spaced connecting studs integrally formed thereon or otherwise suitably attached thereto. In the present example, the object A is in the form of a metal or plastic emblem or nameplate, or the like, provided with a suitable number of integral connecting studs 1 extending in spaced relation along the length of the object. Such connecting studs 1 may otherwise be provided by rivets or similar elements molded with the object or provided thereon in any suitable manner. The underface of the object is substantially flat or of such contour as to seat flush with the surface of a support P in the form of a panel, or the like, with the connecting studs 1 projecting through correspondingly spaced openings in said support P to the rearward side thereof, where cap fasteners 10 in accordance with the invention are applied to the projecting ends of said studs 1 to cover and conceal the same and otherwise provide a pleasing and attractive buttonlike appearance over the ends of said connecting studs 1.

The cap fasteners, designated generally 10, are constructed from relatively thin sections of any suitable sheet metal, preferably spring metal such as spring steel, cold rolled steel or other metal having spring-like characteristics. The fasteners may be provided in any selected shape or outline to comprise a base 11 defining a spring nut, or the like, carried by an overlying cap portion 20 and in this regard, the base 11 may be provided either as an integral portion with the cap 20 or as a separate portion which is retained within the cap in any suitable manner. In the present example, the base 11 is shown comprising a generally rectangular section of a sheet metal blank providing both the base 11 and cap portion 20 of the fastener. The base 11 of the fastener is actually a spring nut comprising a generally rectangular section provided with a central stud opening and spaced parallel slits on opposite sides of said stud opening defining a pair of cooperating tongues 12 which are integral at their lower ends with the end portions 14 of the spring nut and project upwardly between the side or bridge portions 16 thereof.

The said end and bridge portions 14, 16, respectively, provide what may be termed, the body of the spring nut, which body is so formed in the stamping operation as to have a pronounced generally arched or bowed concavo-convex configuration, when normally untensioned. The tongues 12 extend upwardly in a substantial ogee formation from such generally arched body with the extremities thereof preferably notched to provide substantially V-shaped jaws adapted for equal and uniform biting engagement with the threadless connecting stud, rivet, or the like. Said tongues 12 or similar stud engaging elements, otherwise, are resilient and yieldable with respect to the generally arched base 11 and relative to each other and accordingly, the spring nut defined by said base may be applied easily and quickly in one direction to fastening engagement with the connecting stud 1 substantially in the manner of a clutch device, or the like, and locked against movement in an opposite direction toward loosening or removal from applied fastening position. The action is such that when the spring nut 11 is applied to the shank of a threadless stud 1, or the like, the tongue elements 12, being yieldable, readily slide along the stud until the spring nut engages the support P or part secured; at such point, upon pressure on the arched or bowed bridge portions 16 to flatten the same, the end portions 14 are moved from their initial, normally untensioned position in the generally arched base outwardly and upwardly in a substantial lifting force which is transmitted to the tongues 12 to urge the extremities thereof inwardly toward each other such that said tongues 12 are caused to cut into and become embedded in the stud 1 and resist any tendency toward reverse movement or loosening.

It will be understood, accordingly, that the bending moment which serves to lock the spring nut 11 onto the threadless stud 1 is produced by the tensioned bridge portions 16 which are flattened against the adjacent surface of the support P, and which, in attempting to assume their initial, normally untensioned configuration in the generally arched body of the spring nut, cause the tongues 12 to be urged inwardly toward each other to locking engagement with the stud 1. It has been found that the most effective locking action of the spring nut 11 in a tight, rigid installation is obtained when the arched or concave body thereof is flattened without any substantial pressure being exerted on the tongue elements 12. Any substantial pressure on the tongues 12 prevents the same from having smooth, sliding engagement with the stud 1 on being applied, and also deforms the same with respect to the generally arched body 11 of the spring nut such that the extremities of the tongues 12 are not in most effective engagement with the said stud, wherefore said tongues 12 have a tendency to slip and thereby result in a faulty, loose fastening installation.

The cap type fasteners 10 of the invention are constructed for application in accordance with the foregoing by means of a suitable tool T in a manner whereby a tight installation is ensured and any such tendency of the tongues 12 of the spring nut to slip or loosen from applied fastening position is eliminated inasmuch as the pressure for advancing the spring nut to locked fastening engagement on the threadless stud or bolt 1 is applied directly to the bridge portions 16 to flatten the generally concave body of the spring nut without deforming the tongues 12; and thus, when the tool T is withdrawn and the attendant pressure removed from the flattened bridge portions 16, the tension stored therein causes the tongues 12 to move inwardly toward each other and become embedded in the stud 1 by a pronounced cutting action thereby ensuring a positive locking action of the tongues 12 with the stud 1 under continuously effective spring tension. At the same time, an axial pull or drawing action is exerted on the stud 1 by the generally concave body of the spring nut 11 in attempting to assume its normal, untensioned configuration, such that the stud 1 not only is locked in applied position, but the parts of the assembly are rigidly and tightly secured.

The spring nut or base 11 of the fastener is thus provided in conjunction with the overlying cap portion 20 which covers and conceals the spring nut 11 but with suitable provision for the application of the tool T to the arched or bowed bridge portions 16 of said spring nut 11. The cap portion 20 is shown provided in a hollow, generally cup-shaped formation defining a dome 21 having sloping side faces 23 merging into dependent side flanges 25 along the sides thereof, and similar sloping faces 27 on the ends thereof merging into dependent end flanges 29. The side flanges 25 and end flanges 29 are formed in a box-like arrangement around the intermediate dome 21 to define the periphery of the fastener as best seen in Fig. 2. An integral web 30 on one of the end flanges 29 is joined to one end of the spring nut 11 to retain the same within the cap portion 20. Preferably clearance cutouts 31 are provided at the opposite sides of said web 30 to permit said web to be bent inwardly as necessary for the spring nut 11 to lie completely within and inside the edges of said flanges 25 and 29, and with the opposite end of the spring nut 11 extending free and spaced from the adjacent end flange 29, as best seen in Fig. 3.

The spring nut 11, accordingly, is completely contained within the cap portion 20 with the bridge portions 16 and free end portion thereof adapted to move as necessary within the cap portion 20 in the application of the tool T to flatten the generally arched body of the spring nut to secure the same in tightened tensioned fastening position on the connecting stud 1. As explained, the most effective locking action of the spring nut 11 is provided when the arched bridge portions 16 thereof are flattened without any substantial pressure on the tongue elements 12. Accordingly, tool receiving recesses or holes 33 are provided in the cap portion 20 in direct alignment with the apexes of the arched bridge portions 16 on the spring nut. These tool receiving recesses or holes 33 are provided in the manner of elongate slots in the sloping side faces 23 in the dome of the fastener and are relatively narrow and inconspicuous so as not to detract from the finished button-like appearance of the fastener 10.

The tool T may be of any suitable character to include a body member 40 which is recessed to provide a pair of spaced head elements or tines 41 adapted to be received in the spaced tool receiving recesses or holes 33 in the cap portion 20 of the fastener in position to engage the apexes of the arched bridge portions 16 of the spring nut within said cap portion 20. The spaced head elements or tines 41 are of sufficient length for the body 40 of the tool to clear the dome 21 of the fastener as seen in Fig. 5, and if desired, may be magnetized for use in applications where a fastener 10 is positioned on said tines or head elements 41 and held on the tool by such magnetism as the fastener is both initially attached and advanced to final fastening position on a connecting stud 1.

From the foregoing, it will be understood that in the usual procedure for attaching a cap fastener 10 in accordance with the invention, the object A is suitably supported against movement relative to the support P, and a fastener 10 easily and quickly attached to the projecting end of the stud 1 at the rearward side of the assembly simply by positioning the fastener with the stud 1 located between the ends of the tongues 12, and pushing the fastener toward the support P until the ends of the flanges 25, 29, bear on the adjacent surface of said support P as seen in Fig. 3. Inasmuch as the tongues 12 are yieldable, the extremities thereof readily snap over the end of the stud 1 and slide thereon to a position substantially as shown in Fig. 3 in which the body 11 of the spring nut remains substantially in its initial arched configuration. In this relation, the parts of the assembly are not tightly secured and the tool T is thereupon applied, as shown in Fig. 3, with the spaced head elements or tines 41 thereof received in the tool receiving recesses or holes 33, as shown in Figs. 4 and 5, and with the ends of said tines or head elements 41 engaging the apexes of the arched bridge portions 16 of the spring nut 11. Pressure is simultaneously exerted on the tool T such that said tines or head elements 41 compress and flatten said generally arched bridge portions 16 as seen in Figs. 4 and 5 in a manner whereby the body of the spring nut 11 is distended from the position shown in Fig. 3 to that shown in Fig. 4. When the tool T is withdrawn and the attendant pressure removed from the bridge portions 16, the spring nut 11 naturally tends to assume its initial, normally untensioned generally arched configuration and in so doing urges the tongues 12 inwardly toward each other and causes the same to cut into and become embedded in the threadless connecting stud 1 in tightened, tensioned locked fastening engagement therewith, as aforesaid. At the same time, the spring nut 11 exerts a certain amount of axial pull on the stud 1 thereby drawing the same axially and ensuring a rigid, tight installation at all times. The same general result is obtained when the tines or head elements 41 of the tool T are magnetized and a cap fastener 10 first positioned thereon and applied to final fastening position on the threadless stud 1 in a single operation.

It will be appreciated that the cap fasteners 10 in accordance with the invention require no more than a simple pushing action to apply the same to final fastening position and that the provision of the tool receiving recesses or holes 33 in the cap portion 20 in direct alignment with the arched bridge portions 16 of the spring nut 11 is such as to ensure an easy and quick positioning of the tines or head elements 41 of the tool T in engagement with the apexes of said arched bridge portions 16 for the final application of the fastener to tightened tensioned fastening position in the most effective manner and in a minimum of time and effort.

The cap fasteners 10 preferably are constructed of relatively thin sheet metal, the thickness of which is selected according to service requirements and the predetermined size of the parts to be secured. The cap fasteners are most effective when provided of spring metal suitably spring tempered and otherwise treated to give the desired toughness and hardness. A cheap and highly effective cap fastener in accordance with the invention may be provided from cold rolled metal such as cold rolled steel which is untempered but of a spring metal nature and capable of providing an effective and reliable securing device as and for the purposes described.

While the invention has been described in detail with specific examples, such examples are intended as illustrations only inasmuch as the invention fully contemplates various modifications which may be provided without departing from the spirit and scope of the invention.

What is claimed is:

1. A cap fastener adapted to be secured and tightened on a stud by a pushing action axially of the stud, said cap fastener comprising a piece of sheet metal defining a generally arched base provided with a stud receiving opening and cooperating tongues extending upwardly from said base and having free ends adjacent said stud receiving opening, said generally arched base comprising arched portions at the sides of said tongues, and a hollow cap integrally connected to and overlying said generally arched base, said hollow cap having spaced holes in alignment with said arched portions of said base and out of line with said tongues, said holes being provided for the application of a tool having spaced elements adapted to pass through said spaced holes and compress said arched portions of said base without engaging said tongues, whereby to tension and tighten said base in the fastening position of the cap fastener on said stud.

2. A cap fastener adapted to be secured and tightened on a stud by a pushing action axially of the stud, said cap fastener comprising a piece of sheet metal defining a generally arched base provided with a stud receiving opening and cooperating tongues extending upwardly from said base and having free ends adjacent said stud receiving opening, said base having arched portions bordering said tongues and separated from said tongues, a hollow cap overlying said base, and a portion connecting one end of said base to an edge portion of said hollow cap with the other end of said base extending free within said hollow cap, said hollow cap having spaced holes in alignment with said arched portions of said base and out of line with said tongues, said holes being provided for the application of a tool having spaced elements adapted to pass through said spaced holes and compress said arched portions of said base without engaging said tongues, whereby to tension and tighten said base in the fastening position of the cap fastener on said stud.

References Cited in the file of this patent

UNITED STATES PATENTS

| Number | Name | Date |
|---|---|---|
| 1,512,653 | Tinnerman | Oct. 21, 1924 |
| 2,137,929 | Tinnerman | Nov. 22, 1938 |
| 2,177,232 | Tinnerman | Oct. 24, 1939 |
| 2,334,046 | Tinnerman | Nov. 9, 1943 |
| 2,470,891 | Hammers | May 24, 1946 |